Figure 1:
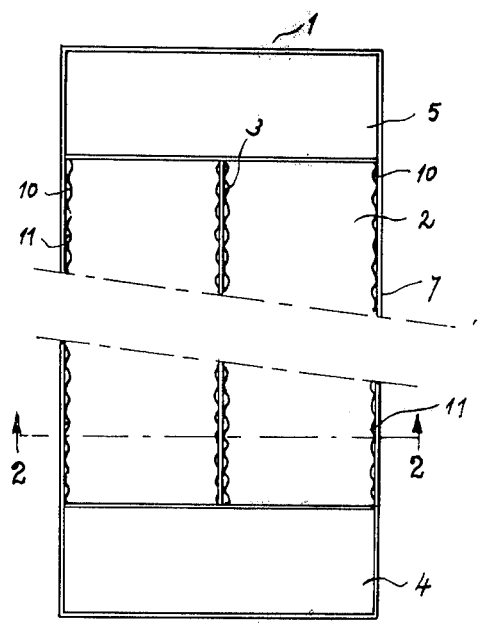

United States Patent [19]

Pielkenrood

[11] 4,273,654
[45] Jun. 16, 1981

[54] SEPARATION DEVICE

[75] Inventor: Jacob Pielkenrood, Krommenie, Netherlands

[73] Assignee: Pielkenrood-Vinitex B.V., Assendelft, Netherlands

[21] Appl. No.: 161,289

[22] Filed: Jun. 20, 1980

[30] Foreign Application Priority Data

Jun. 27, 1979 [NL] Netherlands ............... 7905021

[51] Int. Cl.³ ............................................. B01D 21/00
[52] U.S. Cl. .................................... 210/232; 210/522
[58] Field of Search ................ 210/83, 84, 232, 521, 210/522

[56] References Cited

U.S. PATENT DOCUMENTS

| | | | |
|---|---|---|---|
| 2,868,384 | 1/1959 | Puddington | 210/521 |
| 3,385,439 | 5/1968 | Bach | 210/522 |
| 3,741,401 | 6/1973 | Hsiung | 210/521 |
| 3,837,501 | 9/1974 | Pielkenrood | 210/522 |
| 3,852,199 | 12/1974 | Wachsmuth | 210/522 |
| 3,898,164 | 8/1975 | Hsiung | 210/521 |
| 4,039,449 | 8/1977 | Soriente | 210/522 |
| 4,132,651 | 1/1979 | de Jong | 210/522 |

FOREIGN PATENT DOCUMENTS

| | | | |
|---|---|---|---|
| 2551623 | 6/1977 | Fed. Rep. of Germany | 210/522 |
| 1098155 | 7/1955 | France | 210/521 |
| 7001713 | 8/1971 | Netherlands. | |
| 7004494 | 9/1971 | Netherlands. | |

Primary Examiner—Ernest G. Therkorn
Attorney, Agent, or Firm—Smyth, Pavitt, Siegemund & Martella

[57] ABSTRACT

A separation device, comprising an assembly of substantially parallel corrugated plates arranged in a basin at an angle with the horizontal plane, defining therebetween separation passages through which the liquid to be treated is passed as a flow crossing the corrugation axes, so that the components separated from said flow will be removed between the corrugations and transversely to the liquid flow, and shielded from the latter by said corrugations, towards discharge passages at an extremity of said plates, in which passages guiding baffles are provided for suppressing short-circuit flows past the plate assembly. The improvement is that the plates extend up to the lateral walls of the basin, contacting the wall in question in alternating extreme points of the corrugations, the intermediate extreme points in which the separated components are being discharged remaining at a distance from said wall thus providing discharge passages, the guiding baffles being provided in at least a part of the latter. At least a part of the corrugated plates can be provided with cut-outs so as to widen the discharge passages. For simplifying mounting and cleaning groups of plates are combined to subassemblies by means of draw-bars and distance pieces, and in the corners of the assembly smaller subassemblies can be arranged so as to fill substantially the whole cross-section of the basin.

8 Claims, 5 Drawing Figures

SEPARATION DEVICE

The invention relates to a device for separating from a liquid components suspended therein, comprising an assembly of substantially parallel plates arranged in a basin at an angle with the horizontal plane, between which plates separation passages are defined, which plates are provided with mutually parallel corrigations having generatrices which include an angle of less than 90° with the line of maximum inclination of the plates, two opposite transverse walls of the basin, joining the oblique lateral edges of the plates, forming a connection with a liquid supply and discharge chamber respectively, the shape and dimensions thereof substantially corresponding to the cross-section of the plate assembly parallel to these walls, which chambers are connected to a liquid supply and discharge duct respectively, all this in such a manner that the liquid flow between these chambers through the separation passages is directed transversely to the corrugations of the plates, the lowest or highest terminal edges respectively of these plates joining collecting ducts for heavy and light components respectively, which are collected in the lower and higher parts respectively of the plate corrugations, and slide along these parts towards the extremity in question, at which extremity of the corrugated plates guiding partitions are provided which are directed towards a collecting chamber for the component in question, which partitions are adapted to prevent the liquid from flowing past the plate assembly.

Such a separating device is known from NL-A 70 01 713 and 70 04 494. The advantage of this so-called cross-flow separation is that the separated components are allowed to flow off more or less in the shadow of the corrugations and out of contact with the liquid flow, and, in contrast to the generally used longitudinal flow separation, is not influenced by the liquid flowing in the same or opposite sense, so that less remixing by turbulences will take place. The separation effect can, therefore, be better in cross-flow separation than in longitudinal flow separation, provided that care is taken to prevent that components flowing off at the extremities of the corr gated plates are dragged along again by the liquid flow, and, therefore, in the above-mentioned known device transverse guiding partitions are used which will suppress short-circuit flows of the liquid past the plate assembly.

This known device has, however, some disadvantages. Manufacturing such a device is rather complex, since, with the exception of the supply and discharge chambers for the liquid, also collecting ducts for the separated components should communicate with the basin, which makes the structure of the basin more complex, and, moreover, reduces the useful space for the plates at equal external dimensions. The oblique orientation of the plates transversely to the liquid flow leads, moreover, to lozenge-shaped cross-sections of the plate assembly, and, thus, to an unfavourable space utilisation of the basin, or requires complex oblique basin constructions.

It is the object of the invention to provide a more simplified structure of such a cross-flow separator not having these disadvantages, and which is characterised in that the corrugated plates extend up to the lateral walls in question, and contact the lateral wall in question of the basin compartment in which they are arranged at their lower edge with their corrugation tops, and at their upper edge with their corrugation valleys, there being a distance between the valleys and tops respectively and said wall, thus forming a discharge passage for the separated component flowing off at that extremity, and in that the guiding partitions are mounted against the lateral wall in question, said partitions each being aligned with a series of superposed corrugation valleys or tops resp., in particular in such a manner that these partitions extend into said discharge passages.

In this manner no separate discharge ducts for the separated components are required anymore, so that no useful space is lost. If the discharge passages are still insufficiently large, the corrugated plates can be additionally cut away in those portions which do not contact the wall in question.

Although these plates can be supported now in a simple manner in supporting points on the transverse walls or guiding partitions, mounting such plates separately is objectionable, and removing such plates for cleaning purposes would then become time-consuming. The possibility of removing the plates is very important since the plates cannot be cleaned in the basin, as the extremities of the corrugations are not or hardly accessible.

It is, therefore, preferred to divide the plate assemblies into subassemblies each comprising a plurality of interconnected plates of equal length kept at the correct distance by distance pieces, which subassemblies have a substantially parallelogram-shaped cross-section in a plane through superposed corrigation axes, which subassemblies can be stacked one upon the other, and, more specifically, subassemblies with a triangular or trapezoidal cross-section consisting of plates of different lengths can be placed in the remaining lower and upper corners. Such subassemblies can be easily transported and put in place, and removing them for cleaning purposes is simple too. The number of plates in such a subassembly is, in principle, not limited, but is determined by practical considerations, such as, for instance, the desired weight, the inclination in respect of the height of the basin, etc.

It has appeared to be favourable to interconnect a plurality of plates by means of draw-bars with the interposition of tube sections surrounding these bars and acting as distance pieces, which bars are directed substantially perpendicularly to the plates. At least at one extremity the draw-bars can be adapted to act as a distance piec in respect of an adjacent subassembly, said extremities either engaging a portion of an adjacent plate, or fit in or on a terminal portion of a bar of this adjacent subassembly if both bars are mutually aligned.

If the basin is divided into two or more partial spaces by means of partitions directed in the flow direction, such a plate assembly can be arranged in each partial space without requiring special provisions for discharging the separated components.

Figure 2:
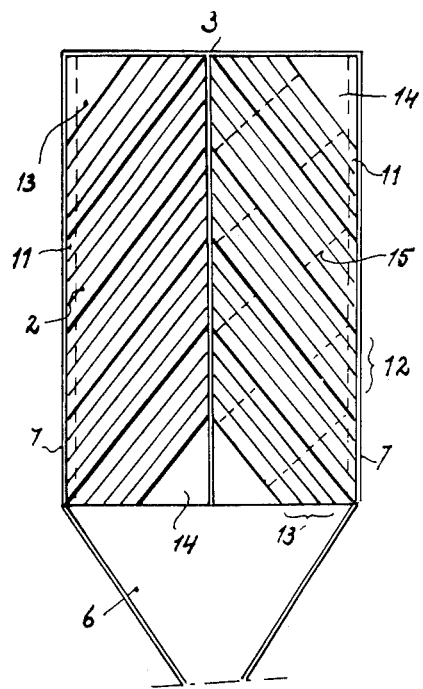
Figures 3, 4:
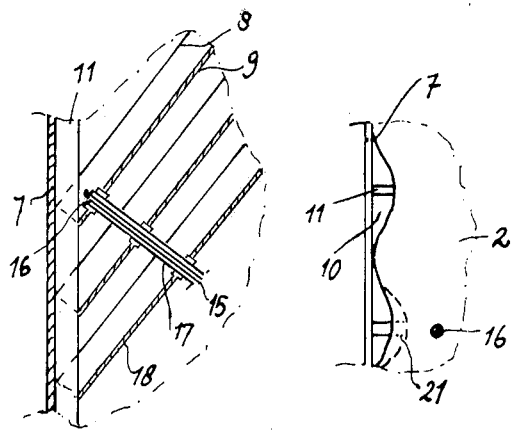

The invention will be elucidated below by reference to a drawing, showing in:

FIG. 1 a diagrammatical top view of a device according to the invention;

FIG. 2 a diagrammatical cross-section on line II—II of FIG. 1;

FIG. 3 a partial section at a larger scale of a terminal part of a plate assembly of this device;

FIG. 4 a top view of the part of FIG. 3; and

Figure 5:
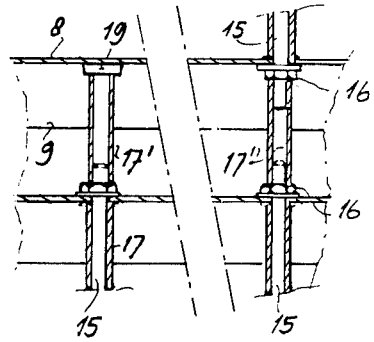

FIG. 5 a corresponding partial section of other parts of this assembly with special distance pieces.

In FIGS. 1 and 2 a cross-flow separator according to the invention is shown in a highly simplified and diagrammatical manner. For simplicity's sake it is assumed, for the moment, that the device is designed for separating sedimentating components.

In a basin 1 with a rectangular cross-section mutually parallel corrugated plates 2 are arranged at an inclination, in the case shown in two groups at both sides of a median wall 3, the plates of both groups having an opposite inclination. Moreover, at the extremities of the basin 1, a supply chamber 4 and a discharge chamber 5 resp. are provided, communicating with a supply and discharge duct resp., not shown, for the liquid to be treated. Under the plate assembly a collecting funnel 6 for sediment separated between the plates is arranged.

In FIG. 3 a partial cross-section of the lower extremity of some corrugated plates 2 and the adjacent lateral wall 7 of the basin 1 is shown, and FIG. 4 shows the corresponding top view thereof. The corrugated plates 2 comprise alternating corrugation tops 8 and valleys 9, the plates at this lower extremity bearing with their corrugation tops against the wall 7. As a consequence of the corrugation the corresponding extremities of the valleys will, then, remain at some distance from the wall 7, so that passages 10 are obtained, and the separated sediment can fall downwards through these passages, and will, finally, land in the funnel 6.

In order to avoid that the liquid flow which is transversely directed in respect of the corrigations will entrain the sediment sliding downwards through the passages 10, guiding baffles 11 are mounted on the wall 7 in at least a part of the passages 10. These baffles keep the liquid flow away from the passages 10, so that the sediment discharge can take place unimpededly. Moreover these baffles will have a guiding effect on the sediment flow, and the latter may show some adhesion in respect of these baffles.

At the opposite extremity near the median wall the situation is opposite. There the extremities of the corrigation valleys bear against the wall, and the tops remain at a distance therefrom, so that, again, passages 10 are obtained. If flotating components are present in the liquid, these will escape towards the upper extremities of the corrugation tops, from which they can flotate towards the liquid surface. Also in these passages 10 guiding baffles 11 can be arranged for keeping the liquid flow away from these passages. In the upper part of the basin 1 a suitable discharge means for flotating components should be provided, e.g. an overflow gutter or the like, which has not been shown since such discharge means are generally known.

Although it is possible to arrange the plates 2 one by one in the basin 1, supporting them, for instance, at their extremities on supports mounted on walls 3 and/or 7, in which case the baffles 11 can be designed as such supports, this will generally be too cumbersome, especially since the plates must be removable from the basin for being cleaned. Therefore another manner of supporting the plates is preferred.

In FIG. 2 thicker lines indicate the manner in which a plate assembly can be subdivided into, on the one hand, a plurality of subassemblies 12 with a substantially parallelogram-shaped cross-section, and, on the other hand, smaller subassemblies 13 with a trapezoidal cross-section in the corners. The number of plates shown is, for clearness' sake, shown smaller than in the real case. The extreme corners can be closed by a closing plate 14, since, there, the plate length would become too small. In this manner substantially the whole cross-section of the basin 1 can be effectively used. In the subassemblies the plates 2, which are in the assemblies 12 all of the same length, are interconnected, so that these subassemblies can each be moved in or out of the basin as a unit.

For interconnecting the plates in a subassembly draw-bars 15 are used, which, as follows from FIG. 3, are fixed at their extremities by means of nuts 16 or the like, and which are surrounded by tube sections 17 acting as distance pieces between the successive plates. These draw-bars are directed perpendicularly to the plates. The number of plates interconnected in this manner depends on the allowable length of the extending part 18, and, thus, also on the inclination of the plates.

The successive subassemblies are supported on one another in the manner shown in FIG. 5. The extremity of a draw-bar 15 can be constructed as a supporting foot 19, which, as shown, bears on a corrugation top of an overlying plate or on a corrugation valley of an underlying plate, which foot can also be mounted, as shown, on a tube section 17' fitting on the extremity of a draw-bar 15. If the draw-bars of adjacent subassemblies are mutually aligned, it is possible, as shown in the right-hand side of FIG. 5, to arrange a supporting sleeve 17" between the bar extremities in question.

Only at the lower end of the basin 1 additional supporting means for supporting the plate assembly should be provided, e.g. a plurality of bars spanning this lower end. The number of draw-bars 15 in the longitudinal direction of the corrugations can be small, since the plates have a large stiffness in that direction.

If the passages 10 are not wide enough for discharging the flow of separated components, the plates 2 can be cut out there, e.g. as shown in FIG. 4 at 21. This will be useful, in particular, in those plates which are nearer to the collecting space for the component in question.

Sometimes it can be advisable to provide additional baffles which, for instance, can be aligned with the vertical baffles 11, and which are either situated at the upper side of the plates 2, and, then, extend above the liquid surface and below the floating layer present there, so as to protect the latter against disturbance by the liquid flow, or below the plates 2, and, then, extending into the sediment layer in the funnel 6, also with the aim to arrest, there, the liquid flow. In particular corresponding windows delimiting the liquid flow can be provided at the inflow and outflow ends. Furthermore it is possible to connect such transversal baffles and parts of the baffles 11 with the subassembly in question.

It will be clear that the device can be constructed with only one or with more than two plate spaces, and that the plates into adjacent spaces can also have the same inclination, whereas the inclination in the case of FIG. 2 can also be oppositely directed.

I claim:

1. A device for separating from a liquid components suspended therein, comprising an assembly of substantially parallel corrugated plates arranged in a basin at an angle with the horizontal plane, between which plates separation passages are defined, which plates are provided with mutually parallel corrugations having generatrices which include an angle of less than 90° with the line of maximum inclination of the plates, two opposite transverse walls of the basin, joining the oblique lateral edges of the plates, forming a connection with a liquid supply and discharge chamber respectively, the shape and dimensions thereof substantially corresponding to the cross-section of the plate assembly parallel to these walls, which chambers are connected to a liquid supply and discharge duct respectively, in such a manner that the liquid flow between these chambers is directed substantially transversely to the corrugations of these plates, the lowest or highest terminal edges respectively of these plates joining collecting ducts for heavy or light components respectively, which are collected in the lowest or highest parts respectively of the plate corrugations and slide along these parts towards the extremity in question, at which extremity of the corrugated plates guiding baffles are provided which are directed towards a collecting chamber for the component in question, which baffles are adapted to prevent a liquid flow past the plate assembly, said corrugated plates extending up to the lateral walls in question of the basin, and contacting the lateral walls of the basin compartment in which the plates are arranged, at their lower edges with their corrugation tops and at their higher edges with their corrugation valleys, there being a distance between the corrugation valleys and tops respectively and the lateral wall in question, and, thus, forming a discharge passage for the separated component flowing off at that extremity, and in that the guiding baffles are mounted against the lateral wall in question, and are aligned with a series of superposed corrugation valleys or tops respectively.

2. The device of claim 1, further in which the guiding baffles extend into the discharge passages.

3. The device of claim 1 or 2, further in which the corrugation parts of a plate not contacting the wall in question are additionally cut away for increasing the passage in question.

4. The device of claim 1, further in which the plate assembly consists of subassemblies, each comprising a plurality of interconnected plates of substantially the same length kept at the correct distance by means of distance pieces, which subassemblies have a substantially parallelogram-shaped cross-section in a plane through corresponding generatrices of superposed plates.

5. The device of claim 4, further in which, in the remaining corners, subassemblies are placed comprising plates of different lengths and having a substantially triangular or trapezoidal cross-section.

6. The device of claim 4 or 5, further in which each plate assembly comprises a plurality of plates which are interconnected by means of draw-bars with the interposition of tube sections surrounding these bars and acting as distance pieces, which bars are directed substantially perpendicularly to the plates.

7. The device of claim 6, further in which the draw-bars, at least at one extremity, are shaped as a distance piece for an adjacent subassembly, which distance piece is adapted to engage either a portion of a plate of this adjacent subassembly, or with the terminal piece of a draw-bar aligned therewith.

8. The device according to any one of claims 1, 2, and 4, further in which the basin is subdivided by means of at least one longitudinal partition into a corresponding number of partial spaces, in each of which partial spaces a plate assembly is arranged.

* * * * *